United States Patent [19]

Harada et al.

[11] Patent Number: 5,587,447
[45] Date of Patent: Dec. 24, 1996

[54] COPOLYAMIDE PRODUCTION METHOD

[75] Inventors: Masahiro Harada; Yasuo Inaba, both of Hiratsuka, Japan

[73] Assignee: Mitsubishi Gas Chemical Co., Inc., Tokyo, Japan

[21] Appl. No.: 417,118

[22] Filed: Apr. 5, 1995

[30] Foreign Application Priority Data

Apr. 7, 1994 [JP] Japan .................. 6-069415

[51] Int. Cl.$^6$ .................. C08G 69/28
[52] U.S. Cl. .................. 528/347; 528/310; 528/331; 528/335; 528/339; 528/340
[58] Field of Search .................. 528/331, 310, 528/347, 339, 340, 335

[56] References Cited

U.S. PATENT DOCUMENTS 4,433,136  2/1984  Miyamoto et al. .................. 528/347

FOREIGN PATENT DOCUMENTS 0214925  3/1989  Japan .

Primary Examiner—Jeffrey C. Mullis
Assistant Examiner—P. Hampton-Hightower
Attorney, Agent, or Firm—Wenderoth, Lind & Ponack

[57] ABSTRACT

A method for producing a copolyamide, which comprises (1) heating either one dicarboxylic acid selected from the group consisting of adipic acid and a mixture containing 40 mol % or more of adipic acid to a temperature higher than the melting point of adipic acid but lower than a temperature lower by 30° C. than the melting point of the resulting copolyamide, (2) dropping a diamine comprising paraxylylene diamine and metaxylylene diamine into the heated dicarboxylic acid before a conversion of the dicarboxylic acid reaches 90 mol %, (3) stopping dropping of the diamine before the conversion of the dicarboxylic acid reaches 90 mol %, and dropping metaxylylene diamine or a diamine mixture of metaxylylene diamine and paraxylylene diamine in place of the diamine until a molar ratio of the total of the diamines to the total of the dicarboxylic acids becomes 0.97 to 1.03, and (4) heating a reaction system to a temperature higher than a temperature lower by 30° C. than the melting point of the finally formed copolyamide before the conversion of the dicarboxylic acid reaches 95 mol %, and elevating the temperature of the reaction system to a temperature higher than the melting point of the finally formed copolyamide upon termination of dropping the diamine.

6 Claims, No Drawings

COPOLYAMIDE PRODUCTION METHOD

BACKGROUND OF THE INVENTION

1. Field of the Invention

This invention relates to a method for producing a copolyamide which contains meta- and para-xylylene diamines as the diamine component and adipic acid as the main dicarboxylic acid component. More specifically, this invention relates to a method for producing a copolyamide, which has the above homogeneous composition, is crystalline and colorless and is excellent in heat resistance, in accordance with a direct polycondensation method.

2. Description of the Related Art

JP-B-14925/1989 (the term "JP-A" as used herein means an "unexamined published Japanese patent application") discloses a method for producing a polyamide wherein, when a dicarboxylic acid component and a diamine component are directly mixed to carry out a polycondensation reaction under normal pressure, a reaction temperature is controlled in such a manner that a reaction start temperature higher than the melting point of the dicarboxylic acid is elevated to maintain a reaction system including a starting mixture substantially in a uniform molten state to proceed with the reaction, and the temperature of the reaction system is further elevated beyond a temperature lower by 30° C. than the melting point of the resulting polyamide before a conversion reaches 95 mol % so that the reaction can proceed in the homogeneous system without losing fluidity in the system.

The above production method is characterized in that the diamine is added continuously to the reaction system while the reaction system containing the formed oligoamide/polyamide is maintained in a uniform molten state, and in this method, since the reaction is conducted under normal pressure, a polycondensation reactor does not need to be a container having pressure resistance.

Moreover, this production method does not require the time needed for operations to increase and reduce pressure to be applied to the reaction system and the time to distill off water used as a solvent in the case of an aqueous solution method. Therefore, compared with a conventional polyamide production method, this method can significantly reduce the time required for polycondensation. Further, the method does not require a calorie needed for the concentration of the aqueous solution and allows an amount to be charged for each reaction to be in a large quantity, thereby making it possible to enhance productivity. Therefore, the method is an extremely advantageous method for producing polyamide.

However, when a polyamide having a high melting point which comprises as a diamine component meta/para mixed xylylene diamine containing more than 30 mol % of paraxylylene diamine is produced with this method, relatively low volatile paraxylylene diamine is caused preferentially to react in the reaction system, and a polyamide having a higher melting point and a high content of paraxylylene group is formed. As a result, the polyamide is solidified and precipitated locally in the reaction system and a uniform molten state is hardly maintained, thereby making it impossible to obtain a product having stable performance.

OBJECTS OF THE INVENTION

It is therefore an object of the invention to provide a method for producing a copolyamide having a high melting point from a mixed diamine which consists of paraxylylene diamine and metaxylylene diamine and a dicarboxylic acid comprising adipic acid as the main constituent.

It is another object of the invention to provide a method for producing a copolyamide having the above composition in an industrially advantageous manner in accordance with a direct polycondensation method, without producing a polyamide having a high melting point.

It is still another object of the invention to provide a method for producing a copolyamide having the above uniform composition which is crystalline and colorless and is excellent in heat resistance.

It is a further object of the invention to provide a novel method for producing a copolyamide having the above composition, wherein the paraxylylene diamine content of diamine to be added to a polycondensation reaction system is reduced to increase the metaxylylene diamine content of diamine and the polycondensation temperature is elevated, at the final stage where polycondensation has proceeded considerably.

Other objects and advantages of the invention will become more apparent from the following description.

SUMMARY OF THE INVENTION

According to the present invention, the above objects and advantages can be attained by a method for producing a copolyamide which comprises the steps of: (1) heating either one dicarboxylic acid selected from the group consisting of adipic acid and a mixture of 40 mol % or more of adipic acid and 60 mol % or less of other dicarboxylic acid other than adipic acid to a temperature higher than the melting point of adipic acid but a temperature lower than a temperature lower by 30° C. than the melting point of the resulting copolyamide, (2) dropping a diamine comprising 35 to 70 mol % of paraxylylene diamine and 65 to 30 mol % of metaxylylene diamine into the heated dicarboxylic acid continuously or stepwise before a conversion of the dicarboxylic acid reaches 90 mol %, (3) discontinuing the dropping of the diamine before the conversion of the dicarboxylic acid reaches 90 mol % and dropping metaxylylene diamine or a diamine mixture of 70 mol % or more of metaxylylene diamine and 30 mol % or less of paraxylylene diamine in place of the diamine continuously or stepwise until a molar ratio of the total of diamines to the total of dicarboxylic acids becomes 0.97 to 1.03, and (4) heating the reaction system to a temperature higher than a temperature lower by 30° C. than the melting point of the finally formed copolyamide before the conversion of the dicarboxylic acid reaches 95 mol % and elevating the temperature of the reaction system to a temperature higher than the melting point of the finally formed copolyamide upon termination of dropping of the diamine.

DETAILED DESCRIPTION OF THE PREFERRED EMBODIMENTS

The dicarboxylic acid used in the step (1) is adipic acid or a mixture of adipic acid and other dicarboxylic acid. In the case of a mixture, adipic acid should be contained in an amount of 40 mol % or more and hence, other dicarboxylic acid should be contained in an amount of 60 mol % or less. Adipic acid is preferably contained in an amount of 60 mol % or more, more preferably 80 mol % or more.

Illustrative examples of the other dicarboxylic acid other than adipic acid include aliphatic dicarboxylic acids such as succinic acid, glutaric acid, pimelic acid, suberic acid, azelaic acid, sebacic acid, undecane diacid and dodecane diacid; aromatic dicarboxylic acids such as terephthalic acid, isophthalic acid and 2,6-naphthalene dicarboxylic acid; and the like.

When the adipic acid content of the dicarboxylic acid component is below 40 mol %, particularly in the case of a mixture of an aromatic dicarboxylic acid having a high melting point, unfavorably, it is difficult to ensure the fluidity of the dicarboxylic acid component before start of dropping a diamine.

In other words, in the step (1), the dicarboxylic acid is heated to a temperature higher than the melting point of adipic acid but lower than a temperature lower by 30° C. than the melting point of the formed copolyamide. Preferably, this heating brings the dicarboxylic acid into a fluid state. The term "fluid state" means that the whole dicarboxylic acid is not necessary in a molten state, but may be in a slurry state as a whole, i.e., part of the dicarboxylic acid may be in a molten state and the other part may be still in a solid state.

The reactor used in the present invention is preferably a reaction can equipped with a stirrer and a dephlegmator.

In the above step (1), before the dicarboxylic acid is charged into the reaction can, the reaction can is, preferably, fully substituted with an inert gas. Thereby, a colorless copolyamide is advantageously produced.

According to the production method of the present invention, it is possible to produce a copolyamide directly from a dicarboxylic acid and a diamine without using a solvent and without having a particular restriction on reaction pressure. However, a reaction is preferably carried out under normal pressure or reduced pressure from viewpoints of operation and manufacture of the reactor.

In the step (2), a diamine is dropped into the heated dicarboxylic acid. The diamine contains 35 to 70 mol % of paraxylylene diamine and 65 to 30 mol % of metaxylylene diamine. Dropping of the diamine is carried out continuously or stepwise.

By dropping the diamine, the dicarboxylic acid and the diamine are mixed together and maintained at a temperature higher than the melting point of adipic acid to start a polycondensation reaction. To start amidation at a substantial rate, the reaction temperature is preferably elevated to a temperature higher than 160° C. and set to a temperature at which oligoamide and/or polyamide produced as an intermediate are/is in a molten state and the entire reaction system can be held in a uniform fluid state. Preferred polymerization operation is performed by stirring the dicarboxylic acid in a molten state in the reaction can, adding the diamine to the dicarboxylic acid under normal pressure and maintaining the reaction mixture at a temperature higher than the melting point of the resulting oligoamide and polyamide.

Dropping of the diamine is performed continuously or stepwise as described above, but the addition rate of the diamine is selected in consideration of heat generated by amidation, a calorie consumed to distill off water generated by condensation, and the structures of a cooler and a dephlegmator for separating water generated by condensation and starting compounds and further in consideration of a predetermined reaction temperature, i.e., a temperature at which the reaction system containing starting compounds can be held in a uniform molten state.

Generally, the time required for dropping a diamine varies depending on the size of the reaction can, while it is in a range from 0.5 to 10 hours. During this dropping, water generated by condensation with the progress of the reaction is removed out of the reaction system through the dephlegmator, in which steam temperature at the column top is controlled to 100° to 120° C., and a cooler. Scattered starting materials such as metaxylylene diamine and adipic acid are collected by the dephlegmator and recycled to the reaction can.

As the diamine, aliphatic diamines such as tetramethylene diamine, pentamethylene diamine, hexamethylene diamine, octamethylene diamine and nonamethylene diamine; aromatic diamines such as paraphenylene diamine; alicyclic diamines such as 1,3-bisaminomethyl cyclohexane and 1,4-bisaminomethyl cyclohexane; and the like may be used within the limit of the maximum amount of 20 mol % based on the total of the diamines, in combination with the mixed-xylylene diamine as described above.

In the step (2), addition of the mixed-xylylene diamine having the above composition is stopped before the conversion of the dicarboxylic acid reaches 90 mol %.

In the step (3), metaxylylene diamine, or a mixture comprising 70 mol % or more of metaxylylene diamine and 30 mol % or less of paraxylylene diamine is dropped in place of the diamine used in the step (2) subsequently to the step (2).

If a diamine containing more than 30 mol % of paraxylylene diamine is dropped, relatively low-volatile paraxylylene diamine is caused preferentially to react in the reaction system and a copolyamide having a high content of paraxylylene diamine and a high melting point is formed. Since the copolyamide is solidified and precipitated locally in the reaction system, an uniform molten state cannot be maintained and hence, a product having stable performance cannot be obtained.

The diamine is added continuously or stepwise until a molar ratio of the total of diamines including the diamine added in the preceding step (2) becomes 0.97 to 1.03 based on the total of dicarboxylic acids.

The maximum amount of paraxylylene diamine contained in the copolyamide which is formed by dropping of the diamine having the above composition in the step (3) is controlled to 65 mol %.

If the paraxylylene diamine content of the diamine component exceeds 65 mol %, the resulting copolyamide may have a melting point higher than 300° C., and when such copolyamide is used, moldability extremely deteriorates.

That is, the copolyamide obtained by the method of the invention contains a diamine component which comprises 35 to 65 mol % of metaxylylene diamine and 65 to 35 mol % of paraxylylene diamine and a dicarboxylic acid component which comprises adipic acid, or 40 mol % or more of adipic acid and 60 mol % or less of other dicarboxylic acid.

In the step (4), the temperature of the reaction system is elevated to a temperature higher than a temperature lower by 30° C. than the melting point of the finally produced copolyamide before the conversion of the dicarboxylic acid reaches 95 mol %, while continuing the step (3) of dropping the diamine, until the molar ratio of the diamines to the dicarboxylic acids becomes 0.97 to 1.03.

In other words, as the molecular weight of oligoamide or polyamide formed by a polycondensation reaction increases with the progress of the reaction, the melting point of the reaction product rises and the viscosity of the reaction mixture increases, thereby preventing a rise in the temperature of the contents. As the result, the reaction mixture is easily solidified. Therefore, the reaction temperature must be controlled to rise according to proceeding of the reaction, and the reaction system, i.e., the reaction product, must be always held in a uniform fluid state. In the method of the present invention, this temperature control is performed in such a manner that the temperature of the reaction system is elevated to a temperature higher than a temperature lower by 30° C. than the melting point of the finally produced copolyamide before the conversion of the reaction materials reaches 95 mol %. In this instance, the conversion is expressed by the proportion of reacted functional groups to functional groups originally existent. The conversion can be confirmed with the amount of water formed by a polycondensation reaction. If the conversion is below 95 mol %, the diamine added is reacted in the reaction system in a short period of time and hence, in the actual case, the conversion can be estimated from the proportion of the dropped diamine.

When the production method of the present invention is carried out, like the conventional aqueous solution pressurizing method, it is inevitable that the diamines distill off outside the reaction system. Therefore, it is necessary to provide a polycondensation reactor with a dephlegmator. Provision of the dephlegmator can prevent effectively the diamines containing metaxylylene diamine from distilling out during reaction. As the result, a copolyamide having a predetermined molecular weight can be produced with good reproducibility by setting a molar ratio of the diamine component charged to the dicarboxylic acid component containing adipic acid to 0.97 to 1.03 upon consideration of the desired molecular weight.

The upper limit of the temperature of the reaction system to be controlled does not need to be particularly limited, but preferably is not higher than a temperature higher by 50° C. than the melting point of the finally produced copolyamide in consideration of heat history provided to the resulting product. If the temperature of the reaction system is set to the above predetermined temperature after the conversion exceeds 95 mol %, the copolyamide which is the reaction product begins to be partially crystallized before the temperature is elevated, making it extremely difficult to bring the reaction product into a uniform fluid state. This solidification phenomenon that occurred in the reaction product invites an increase in the viscosity and a reduction in heat conductivity in the reaction system, and may involves a risk of solidifying the entire reaction product in some cases. Under such conditions, it is substantially impossible to produce a copolyamide on an industrial scale.

Upon termination of dropping the diamine component, the temperature of the reaction system is controlled to a temperature higher than the melting point of the finally produced copolyamide.

In other words, the temperature of the reaction system whose conversion exceeds 95 mol % and whose temperature is elevated to a temperature higher than the temperature specified by the present invention is elevated gradually so that the reaction product containing the copolyamide can be held substantially in a uniform fluid state until termination of the reaction.

As described above, although the reaction starts at a temperature higher than the melting point of the starting dicarboxylic acid and a temperature of 160° C. or more at which amidation takes place at a substantial rate, it is possible to elevate the temperature of the reaction system to a temperature higher than a temperature lower by 30° C. than the melting point of the finally produced copolyamide from the beginning of the reaction.

However, it is not always expedient to maintain the reaction system at a high temperature at the beginning of the reaction from a viewpoint of thermal economy or the heat history of the reaction product. Therefore, it is preferred to maintain the reaction system at a temperature higher than a temperature lower by 30° C. than the melting point of the finally produced copolyamide after the conversion exceeds 40 mol %.

The polycondensation reactor used in the method of the present invention does not need to be a container having pressure resistance and hence, can be installed at an extremely low cost. In addition, since the method of the present invention does not require the time needed for operation to increase or decrease pressure and the time to distill out water as a solvent which is required by the conventional aqueous solution method, it can reduce the time required for polymerization significantly. Moreover, the method does not require a calorie which is required for the concentration of an aqueous solution in the conventional method and can enhance productivity because an amount to be charged for each reaction can be made large. As a consequence, the present invention provides an extremely economical method for producing a copolyamide.

The present invention is further illustrated with reference to the following examples.

EXAMPLE 1

A 50-liter flask equipped with a stirrer, dephlegmator, thermometer, dropping funnel, and nitrogen gas introduction tube was charged with 10.000 kg of adipic acid which was accurately weighed, and fully substituted with nitrogen. Further, adipic acid was molten at 170° C. under a trace amount of a nitrogen gas current to achieve a uniform fluid state. To this molten adipic acid was dropped 7.411 kg of a mixed-xylylene diamine comprising metaxylylene diamine and paraxylylene diamine (molar ratio of 5/5) over 91 minutes under agitation. During this dropping, the temperature inside the flask was elevated continuously to 255° C. Subsequently, 1.853 kg of metaxylylene diamine was dropped continuously in 76 minutes under agitation. During this dropping, the reaction temperature was elevated continuously from 255° C. to 270° C. Water which distilled out along dropping of the mixed-xylylene diamine or metaxylylene diamine was removed out of the system through the dephlegmator and the cooler. After termination of dropping metaxylylene diamine, the inside temperature was elevated continuously up to 277° C. and a reaction was continued for 32 minutes. Thereafter, the pressure inside the reaction system was reduced continuously to 600 mmHg over 10 minutes and then the reaction was continued for another 10 minutes. During this time, the reaction temperature was elevated continuously from 277° to 282° C. Throughout the entire reaction process, a phenomenon that formed oligomer or polyamide was solidified and precipitated and the reaction system lost a uniform fluid state was not observed at all.

The resulting polyamide had a relative viscosity of 2.09 (1 g of 96% sulfuric acid solution/100 ml) and a melting point of 269° C.

EXAMPLE 2

A 50-liter flask equipped with a stirrer, dephlegmator, thermometer, dropping funnel, and nitrogen gas introduction tube was charged with 7.000 kg of adipic acid and 3.410 kg of terephthalic acid which were accurately weighed and fully substituted with nitrogen. Further, adipic acid was molten at 170° C. under a trace amount of a nitrogen air current to achieve a uniform fluid state. To this molten adipic acid was dropped 7.343 kg of a mixed-xylylene diamine comprising metaxylylene diamine and paraxylylene diamine (molar ratio of 5/5) over 93 minutes under agitation. During this dropping, the temperature inside the flask was elevated continuously to 245° C. Subsequently, 1.836 kg of metaxylylene diamine was dropped continuously over 74 minutes under agitation. During this dropping, the reaction temperature was elevated continuously from 245° C. to 260° C. Water which distilled out along dropping of the mixed-xylylene diamine or metaxylylene diamine was removed out of the system through the dephlegmator and the cooler. After termination of dropping metaxylylene diamine, the inside temperature was elevated continuously up to 265° C. and a reaction was continued for 32 minutes. Thereafter, the pressure inside the reaction system was reduced continuously to 600 mmHg over 10 minutes and then the reaction was continued for another 14 minutes. During this time, the reaction temperature was elevated continuously from 265° to 271° C. Throughout the entire reaction process, a phenomenon that formed oligomer or polyamide was solidified and precipitated and the reaction system lost a uniform fluid state was not observed at all.

The resulting polyamide had a relative viscosity of 1.98 (1 g of 96% sulfuric acid solution/100 ml) and a melting point of 257° C.

COMPARATIVE EXAMPLE 1

A 50-liter flask equipped with a stirrer, dephlegmator, thermometer, dropping funnel and nitrogen gas introduction tube was charged with 10.000 kg of adipic acid which was accurately weighed and fully substituted with nitrogen. Further, adipic acid was molten at 170° C. under a trace amount of a nitrogen air current to achieve a uniform fluid state. To this molten adipic acid was dropped 7.967 kg of a mixed-xylylene diamine comprising metaxylylene diamine and paraxylylene diamine (molar ratio of 6/4) over 110 minutes under agitation. During this dropping, the inside temperature was elevated continuously to 262° C. Subsequently, 1.297 kg of the mixed xylylene diamine was dropped continuously over 68 minutes under agitation. During this dropping, the reaction temperature was elevated continuously from 262° to 270° C. Water which distilled out along dropping of the mixed-xylylene diamine was removed out of the system through the dephlegmator and the cooler. After termination of dropping the mixed-xylylene diamine, the inside temperature was elevated continuously to 275° C. and a reaction was continued for 32 minutes. Thereafter, the pressure inside the reaction system was reduced continuously to 540 mmHg over 10 minutes and then the reaction was continued for another 10 minutes. During this time, the reaction temperature was elevated continuously from 275° to 282° C. In the latter stage of the dropping step, a phenomenon that the formed oligomer or polyamide was partly solidified and deposited and the reaction system lost an uniform fluid state was observed.

The resulting polyamide resulted in a product having lack of a uniform quality and the main constituent of the product had a relative viscosity of 2.39 (1 g of 96% sulfuric acid solution/100 ml) and a melting point of 269° C.

What is claimed is:

1. A method for producing a copolyamide which comprises the steps of:

(1) heating either one dicarboxylic acid selected from the group consisting of adipic acid and a mixture comprising 40 mol % or more of adipic acid and 60 mol % or less of dicarboxylic acid other than adipic acid to a temperature higher than the melting point of adipic acid but lower than a temperature lower by 30° C. than the melting point of the resulting copolyamide, (2) dropping a diamine comprising 35 to 70 mol % of paraxylylene diamine and 65 to 30 mol % of metaxylylene diamine into the heated dicarboxylic acid stepwise or continuously before a conversion of the dicarboxylic acid reaches 90 mol %, (3) discontinuing the dropping of the diamine before the conversion of the dicarboxylic acid reaches 90 mol %, and dropping metaxylylene diamine or a diamine mixture of 70 mol % or more of metaxylylene diamine and 30 mol % or less of paraxylylene diamine in place of the diamine continuously or stepwise until a molar ratio of the total of the diamines to the total of the dicarboxylic acids becomes 0.97 to 1.03, and (4) heating a reaction system to a temperature higher than a temperature lower by 30° C. than the melting point of the finally formed copolyamide before the conversion of the dicarboxylic acid reaches 95 mol %, and elevating the temperature of the reaction system to a temperature higher than the melting point of the finally formed copolyamide upon termination of dropping the diamine.

2. The method of claim 1, wherein the dicarboxylic acid is a mixture of 60 mol % or more of adipic acid and 40 mol % or less of other dicarboxylic acid.

3. The method of claim 1, wherein the dicarboxylic acid is a mixture of 80 mol % or more of adipic acid and 20 mol % or less of other dicarboxylic acid.

4. The method of claim 1, wherein the other dicarboxylic acid is terephthalic acid.

5. The method of claim 1, wherein a polycondensation reaction between the dicarboxylic acid and the diamine is performed under normal pressure.

6. The method of claim 1, wherein the resulting copolyamide contains a diamine component which comprises 35 to 65 mol % of metaxylylene diamine and 65 to 35 mol % of paraxylylene and a dicarboxylic acid component which comprises adipic acid, or 40 mol % or more of adipic acid and 60 mol % or less of other dicarboxylic acid.

* * * * *